(12) United States Patent
Katoh et al.

(10) Patent No.: US 8,033,168 B2
(45) Date of Patent: Oct. 11, 2011

(54) CATALYST DETERIORATION JUDGMENT DEVICE

(75) Inventors: Kenji Katoh, Sunto-gun (JP); Kei Masuda, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 338 days.

(21) Appl. No.: 12/517,430

(22) PCT Filed: Mar. 13, 2008

(86) PCT No.: PCT/JP2008/054602
§ 371 (c)(1),
(2), (4) Date: Jun. 3, 2009

(87) PCT Pub. No.: WO2008/111639
PCT Pub. Date: Sep. 18, 2008

(65) Prior Publication Data
US 2010/0005873 A1 Jan. 14, 2010

(30) Foreign Application Priority Data
Mar. 13, 2007 (JP) .................. 2007-063353

(51) Int. Cl.
*G01M 15/10* (2006.01)
(52) U.S. Cl. .................. 73/114.75
(58) Field of Classification Search .............. 73/114.69, 73/114.71, 114.73, 114.75
See application file for complete search history.

(56) References Cited

U.S. PATENT DOCUMENTS

2003/0041592 A1 * 3/2003 Nishioka et al. ............ 60/277

FOREIGN PATENT DOCUMENTS

| JP | 8 158917 | 6/1996 |
|---|---|---|
| JP | 10 68346 | 3/1998 |
| JP | 2002 266628 | 9/2002 |
| JP | 2002 266629 | 9/2002 |
| JP | 2002 276419 | 9/2002 |
| JP | 3589179 | 8/2004 |

* cited by examiner

*Primary Examiner* — Eric S McCall
(74) *Attorney, Agent, or Firm* — Oblon, Spivak, McClelland, Maier & Neustadt, L.L.P.

(57) ABSTRACT

A catalyst deterioration judgment device that can accurately perform a catalyst deterioration judgment by considering an oxygen density at downstream of an exhaust purification catalyst. The system reads outputs of an oxygen sensor and an ammonia sensor that are installed in downstream of an NSR catalyst when the catalyst is in an activate condition. When this read oxygen sensor output is equal to or more than a reference value and the ammonia sensor output is equal to or more than a reference value, it is estimated that ammonia oxidizing reaction does not occur under existence of oxygen in the NSR catalyst. In this case, the NSR catalyst is judged to be deteriorated.

20 Claims, 12 Drawing Sheets

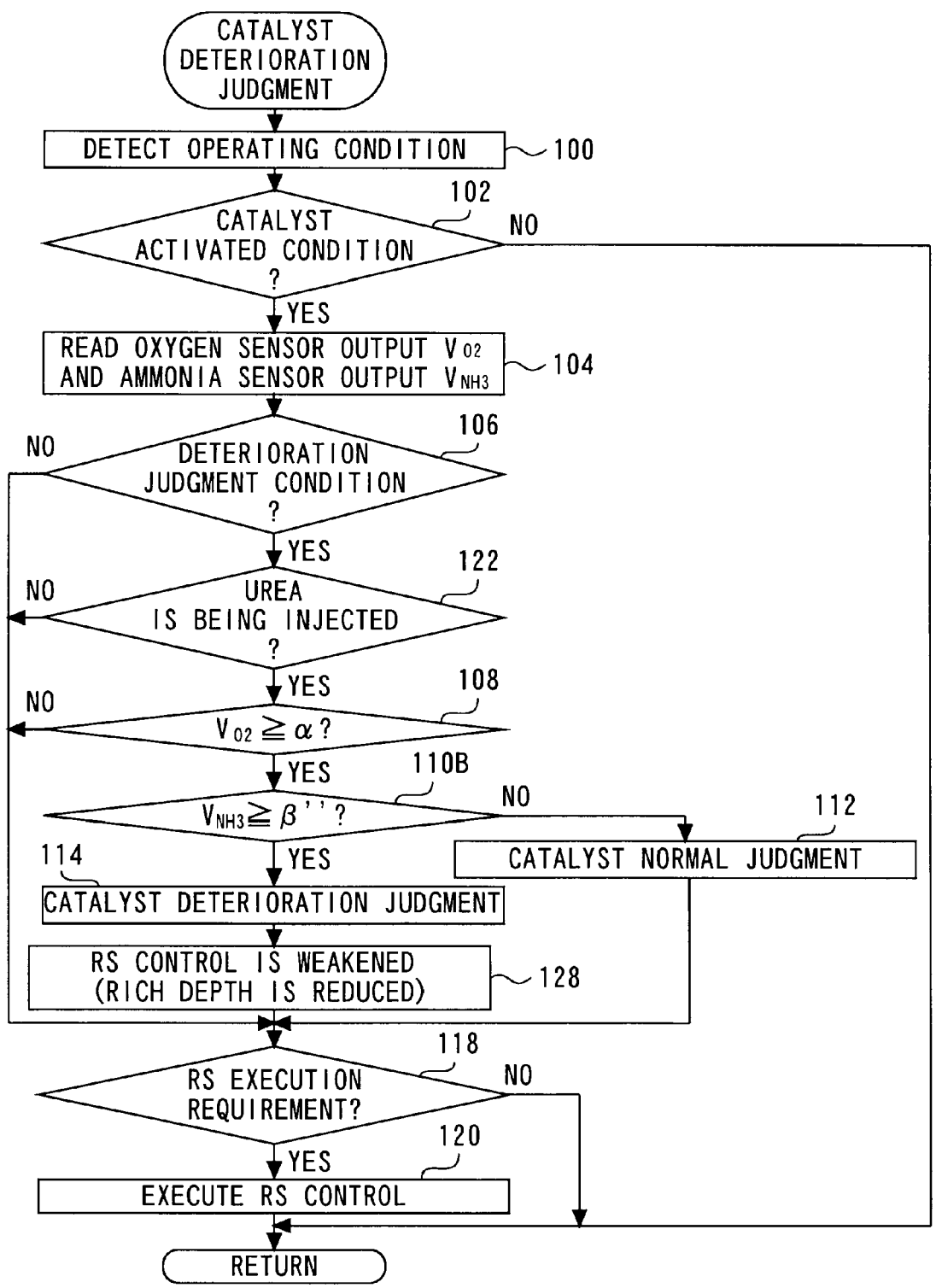

CATALYST DETERIORATION JUDGMENT DEVICE

TECHNICAL FIELD

The present invention relates to an exhaust purification catalyst deterioration judgment device.

BACKGROUND ART

The internal combustion engine that can execute a lean burn operation to improve a output as and the fuel efficiency together is known. A NOx occlusion reduction catalyst is widely utilized to reduce NOx emission amount of such an internal combustion engine.

Because of reinforcement of the recent emission effluent control, it is required to accurately execute a deterioration judgment of a NOx occlusion reduction catalyst. An apparatus detecting deterioration degree of a NOx occlusion reduction catalyst based on a change of the ammonia density at down stream of the NOx occlusion reduction catalyst in a rich air/fuel ratio is known (see, for example, patent document 1). According to this apparatus, the surplus reducing agent amount that was not used for NOx reduction is calculated based on a change of the ammonia density. Since this surplus reducing agent is correlated with the NOx occlusion capacity, the apparatus can detect the degree of deterioration of the NOx occlusion reduction catalyst.

Patent Document 1: Japanese patent bulletin No. 3,589,179
Patent Document 2: Japanese Patent Laid-Open No. 2002-276419
Patent Document 3: Japanese Patent Laid-Open No. 1998-68346
Patent Document 4: Japanese Patent Laid-Open No. 1996

DISCLOSURE OF THE INVENTION

Problem to be Solved by the Invention

It should be noted that there is a case in which a start catalyst is placed at upstream of a NOx occlusion reduction catalyst. Ammonia is generated in rich air/fuel ratio with this start catalyst, and the ammonia production amount may change by its deterioration situation. Further, the ammonia production amount in each catalyst may change according to catalyst bed temperature and space velocity (SV) in the start catalyst and the NOx occlusion reduction catalyst. Moreover, it remains possible that the ammonia production amount is changed greatly accompanied by an accelerator angle change in a transient operation. Thus, there is a room of improvement in the art, since the judgment accuracy is insufficient when the deterioration is determined only from the ammonia density in the down stream of the NOx occlusion reduction catalyst as is done in patent document 1 discussed above.

In order to solve the above mentioned problem, the object of the present invention is to provide a catalyst degradation decision device that can accurately judge the catalyst degradation by considering the oxygen density in downstream of the exhaust purification catalyst.

Means for Solving the Problem

To achieve the above mentioned purpose, the first aspect of the present invention is a catalyst deterioration judgment device, comprising:

an exhaust purification catalyst that is installed in an exhaust system of an internal combustion engine so as to purify the exhaust gas;

an oxygen density detecting means to detect the oxygen density at downstream of said exhaust purification catalyst;

an ammonia density detecting means to detect the ammonia density at downstream of said exhaust purification catalyst; and deterioration judgment means performing a deterioration judgment of said exhaust purification catalyst based of both of said oxygen density and said ammonia density.

Further, the second aspect of the present invention is the catalyst deterioration judgment device according to the first aspect of the present invention, wherein said deterioration judgment means determines that said exhaust purification catalyst is deteriorated when said oxygen density is equal to or more than a predetermined value and said ammonia density is equal to or more than a specified value.

Further, the third aspect of the present invention is the catalyst deterioration judgment device according to the first or second aspect of the present invention, wherein said deterioration judgment means determines that said exhaust purification catalyst is deteriorated when air/fuel ratio is stoichiometric or lean and said ammonia density is equal to or more than a predetermined value.

Further, the fourth aspect of the present invention is The catalyst deterioration judgment device according to the second or third aspect of the present invention, wherein said exhaust purification catalyst comprises a NOx occlusion reduction catalyst that occludes or reduces NOx responding to air/fuel ratio, said catalyst deterioration judgment device further comprising urea injection means that injects urea into upstream of said NOx occlusion reduction catalyst, and wherein said deterioration judgment means performs said deterioration judgment when urea is being injected by said urea injection means.

Further, the fifth aspect of the present invention is the catalyst deterioration judgment device according to the first aspect of the present invention, wherein said deterioration judgment means determines that said exhaust purification catalyst is deteriorated when air/fuel ratio is rich and said ammonia density is equal to or more than a predetermined value under existence of oxygen.

Further, the sixth aspect of the present invention is the catalyst deterioration judgment device according to any one of the second to fifth aspect of the present invention, wherein said deterioration judgment means determines that said exhaust purification catalyst is deteriorated when an ammonia oxidizing reaction does not occur in said exhaust purification catalyst under existence of oxygen.

Further, the seventh aspect of the present invention is the catalyst deterioration judgment device according to the first aspect of the present invention, wherein said exhaust purification catalyst comprises a NOx occlusion reduction catalyst that occludes or reduces NOx responding to air/fuel ratio, and a NOx selective reduction catalyst installed in downstream of said NOx occlusion reduction catalyst; and said deterioration judgment means performs the deterioration judgment of said NOx selective reduction catalyst when air/fuel ratio is rich.

Further, the eighth aspect of the present invention is the catalyst deterioration judgment device according to the seventh aspect of the present invention, wherein said deterioration judgment means determines that said NOx selective reduction catalyst is deteriorated when said oxygen density is equal to or less than a predetermined value and said ammonia density is equal to or more than a predetermined value.

Further, the ninth aspect of the present invention is the catalyst deterioration judgment device according to the first aspect of the present invention, wherein said exhaust purification catalyst comprises a NOx occlusion reduction catalyst that occludes or reduces NOx responding to air/fuel ratio, and a NOx selective reduction catalyst installed in downstream of said NOx occlusion reduction catalyst, said catalyst deterioration judgment device further comprising urea injection means that injects urea into upstream of said NOx occlusion reduction catalyst, and wherein said deterioration judgment means performs said deterioration judgment of said NOx selective reduction catalyst when urea is being injected by said urea injection means so that ammonia is exhausted from said NOx occlusion reduction catalyst.

Moreover, the tenth aspect of the present invention is the catalyst deterioration judgment device according to the ninth aspect of the present invention, wherein said deterioration judgment means determines that said NOx selective reduction catalyst is deteriorated when said oxygen density is equal to or more than a predetermined value and said ammonia density is equal to or more than a predetermined value.

Advantages of the Invention

According to the first aspect of the present invention, deterioration judgment of the exhaust purification catalyst is executed based on both of the oxygen density and the ammonia density at downstream of the exhaust purification catalyst. In a case where ammonia coexists with oxygen in the exhaust purification catalyst, both of them react to each other if the exhaust purification catalyst is normal, whereby there will be no ammonia in the downstream of the exhaust purification catalyst. On the other hand, the reaction of both of them would not occur in the exhaust purification catalyst if the exhaust purification catalyst is deteriorated. Accordingly, the deterioration judgment can be executed accurately by executing it based on both of the oxygen density and the ammonia density.

According to the second aspect of the present invention, it is estimated that the reaction between oxygen and ammonia does not occur in the exhaust purification catalyst, when the oxygen density at the downstream of the exhaust purification catalyst is equal to or more than the predetermined value and the ammonia density is equal to or more than the predetermined value. Thus, judgment can be made that the exhaust purification catalyst is deteriorated.

According to the third aspect of the present invention, the oxygen density at the downstream of the exhaust purification catalyst becomes equal to or more than the predetermined value when the air/fuel ratio is stoichiometric or lean. If, in addition to this, the ammonia density at the downstream of the exhaust purification catalyst is equal to or more than the predetermined value, it can be estimated that the reaction between oxygen and ammonia does not occur in the exhaust purification catalyst. Accordingly, judgment can be made that the exhaust purification catalyst has been deteriorated.

According to the fourth aspect of the present invention, ammonia is produced in exhaust gas and in the NOx occlusion reduction catalyst when urea is injected into the upstream of the NOx occlusion reduction catalyst. Accordingly it is possible to perform the deterioration judgment even in a condition in which sufficient amount to ammonia and oxygen coexist in the NOx occlusion reduction catalyst.

According to the fifth aspect of the present invention, ammonia is generated in the exhaust purification catalyst, and, for example, occluded NOx in the catalyst is disassembled to nitrogen and oxygen by a reductive reaction (purification). Accordingly, it is possible to perform the deterioration judgment even in a condition in which oxygen and ammonia coexist in the exhaust purification catalyst. Further, in a case where the ammonia density at the downstream of the exhaust purification catalyst is equal to or more than the predetermined value, estimation can be made that a reaction between oxygen and ammonia does not occur in the exhaust purification catalyst, and thus judgment can be made that the exhaust purification catalyst has been deteriorated.

According to the sixth aspect of the present invention, the exhaust purification catalyst is judged to be deteriorated when the ammonia oxidizing reaction does not occur under existence of oxygen in the exhaust purification catalyst. The ammonia oxidizing reaction in the exhaust purification catalyst is the most basic reaction. The present invention can perform the deterioration judgment of the exhaust purification catalyst accurately by focusing the most basic reaction in the exhaust purification catalyst.

According to the seventh aspect of the present invention, the ammonia exhausted from the NOx occlusion reduction catalyst flows into the NOx selective reduction catalyst when the air/fuel ratio is rich. The NOx selective reduction catalyst can occlude the ammonia when it is normal, but cannot occlude the ammonia when it is deteriorated whereby the ammonia will flow out from the NOx selective reduction catalyst. It is, therefore, possible to execute the deterioration judgment of the NOx selective reduction catalyst accurately based on the oxygen density and the ammonia density at the downstream of the NOx selective reduction catalyst.

In a case where the oxygen density at the downstream of the NOx selective reduction catalyst is higher than the predetermined value, it remains possible that the ammonia oxidizing reaction occurs in the NOx occlusion reduction catalyst thereby preventing the ammonia from flowing into the NOx selective reduction catalyst. According to the eighth aspect of the present invention, the NOx selective reduction catalyst is judged to be deteriorated, when the oxygen density at the downstream of the NOx selective reduction catalyst is equal to or less than the predetermined value and the ammonia density is more than the predetermined value. Accordingly, the present invention can perform the deterioration judgment of the NOx selective reduction catalyst accurately under a situation in which sufficient amount of ammonia flows into the NOx selective reduction catalyst.

According to the ninth aspect of the present invention, the deterioration judgment of the NOx selective reduction catalyst is performed when urea is injected from the urea injection means so that ammonia is drained from the NOx occlusion reduction catalyst. Thus, the present invention can supply sufficient amount of ammonia into the NOx selective reduction catalyst even if the air/fuel ratio is stoichiometric or lean thereby being able to perform the deterioration judgment of the NOx selective reduction catalyst accurately.

In a case where the air/fuel ratio is stoichiometric or lean, the oxygen density at the downstream of the NOx selective reduction catalyst becomes higher than the predetermined value. Thus, according to the tenth aspect of the present invention, the deterioration judgment of the NOx selective reduction catalyst can be performed accurately even in a case in which the air/fuel ratio is stoichiometric of lean.

BRIEF DESCRIPTION OF THE DRAWINGS

FIG. 12 is a flowchart of a routine executed by the ECU 60 in the sixth embodiment of the present invention;

Figure 1:
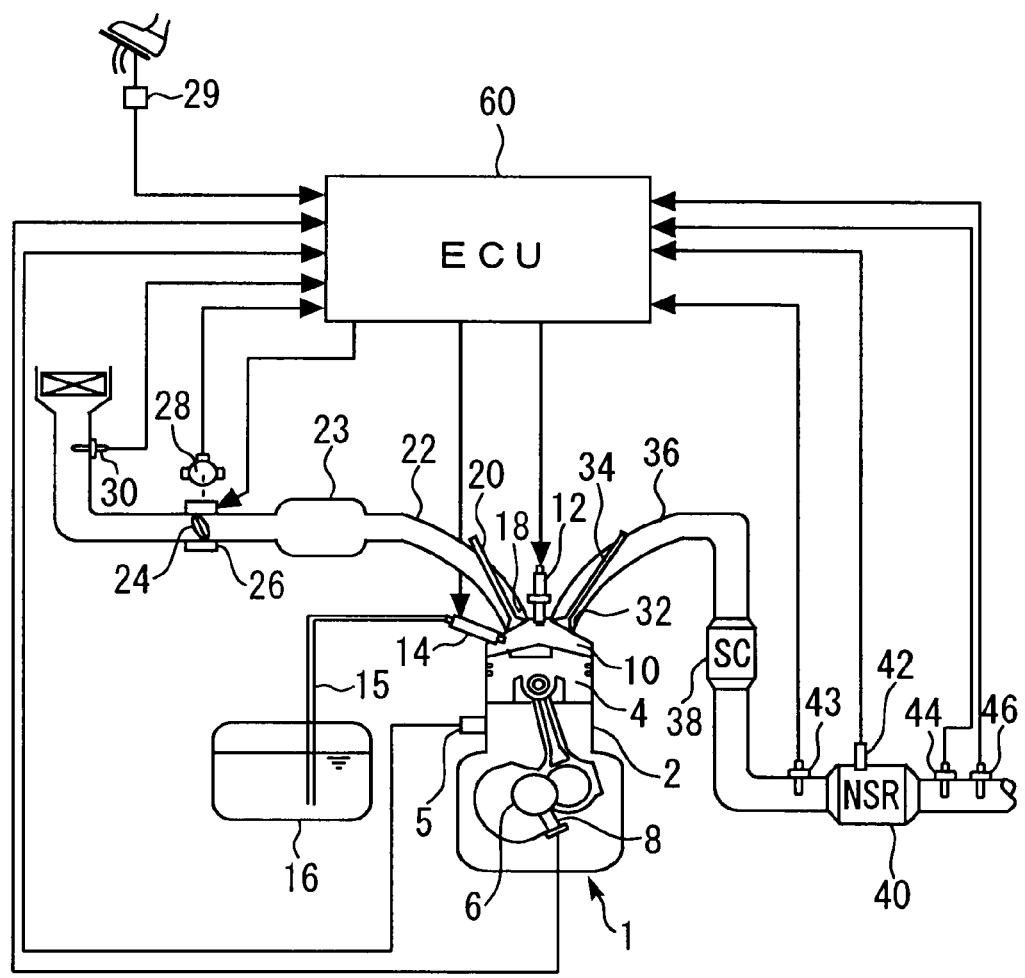
FIG. 1 is a drawing to explain the structure of a system according to a first embodiment of the present invention.

DESCRIPTION OF REFERENCE NUMERALS 1 internal combustion engine
36 exhaust path
38 start catalyst
40 NSR catalyst
44 oxygen sensor
46 ammonia sensor
48 urea injector
52 SCR catalyst
60 ECU

BEST MODE FOR CARRYING OUT THE INVENTION

Embodiments of the present invention will now be described with reference to the accompanying drawings. Like elements in the drawings are designated by the same reference numerals and will not be redundantly described.

First Embodiment

Description of System Configuration

FIG. 1 is a diagram illustrating the configuration of a system according to a first embodiment of the present invention. The system shown in FIG. 1 includes an internal combustion engine 1, which is a four cycle spark ignition type gasoline engine. The engine 1 is capable of performing a lean burn and has a plurality of cylinders 2. In FIG. 1, only one cylinder among the plurality of cylinders is shown. Further, the present system includes a cooling water temperature sensor 5 detecting a cooling water temperature Tw of the internal combustion engine 1.

A piston 4 is arranged to an interior of each cylinder 2. The piston 4 is connected to a crankshaft 6 through crank mechanism. A crank angle sensor 8 is provided in the vicinity of the crankshaft 6. The crank angle sensor 8 is constructed so as to detect the rotation angle (crank angle CA) of the crankshaft 6.

An ignition plug 12 to ignite fuel/air mixture gas in a combustion chamber 10 is installed above the piston 4. The internal combustion engine 1 includes a fuel injector 14 to directly inject fuel into the combustion chamber 10. This fuel injector 14 is connected to a fuel tank 16 through a fuel passage 15.

The connected part between the combustion chamber 10 and an induction port 18 is provided with an intake valve 20. The intake port 18 is connected to an intake path 22. The intake path 22 has a surge tank 23 in the middle part thereof. Upstream of the surge tank is provided with a throttle valve 24. The throttle valve 24 is of an electronic controlled type that is driven by a throttle motor 26. The throttle valve 24 is driven based on an accelerator angle AA detected by an accelerator angle sensor 29. In the vicinity of the throttle valve 24 is provided with a throttle angle sensor 28 that detects a throttle angle. Upstream of the throttle valve 24 is provided with an air flow meter 30 that detects intake air amount Ga.

The connected part between the combustion chamber 10 and an exhaust port 32 is provided with an exhaust valve 34. The exhaust port 32 is connected to an exhaust path 36. The exhaust path 36 is provided with a start catalyst (SC) 38 in the middle thereof. Down stream of the start catalyst 38 is provided with a NOx occlusion reduction catalyst (an NSR catalyst) 40. The NSR catalyst 40 is provided with a catalyst bed temperature sensor 42 that detects a catalyst bed temperature. Between the NSR catalyst 40 and the start catalyst 38 is provided with an air-fuel ratio sensor 43 that detects an exhaust air/fuel ratio.

Down stream of the NSR catalyst 40 is provided with an oxygen sensor 44 and an ammonia sensor 46. The oxygen sensor 44 is constructed to detect oxygen density. The ammonia sensor 46 is constructed to detect ammonia density.

Further, the system according to the present embodiment includes an ECU (Electronic Control Unit) 60 as a control device. The outputs of the ECU 60 are connected to the ignition plug 12, fuel injector 14, accelerator motor 26 or the like. The inputs of ECU 60 are connected to the cooling water temperature sensor 5, crank angle sensor 8, throttle angle sensor 28, accelerator angle sensor 29, airflow meter 30, catalyst bed temperature sensor 42, oxygen sensor 44, ammonia sensor 46 or the like. The ECU 60 performs total control of the internal combustion engine including a fuel injection control (which includes an air-fuel ratio feed back control) and an ignition timing control, based on the outputs of each sensor.

Moreover, the ECU 60 calculates an engine revolution number NE based on the output of the crank angle sensor 6. In addition, the ECU 60 calculates an load KL to the internal combustion engine 1 based on the accelerator angle AA and the throttle angle TA or the like.

Feature of First Embodiment

According to the above-described system, the internal combustion engine 1 can execute a lean burn operation in which burning is performed with an air/fuel ratio (hereinafter referred to "lean air/fuel ratio") leaner than stoichiometric. The NSR catalyst 40 is installed in order to occlude exhausted NOx from the internal combustion engine 1 during the lean burn operation.

It should be noted that the above stated patent document 1 discloses an example of a deterioration detecting apparatus for an NSR catalyst. In this apparatus, the surplus reducing agent amount that was not used for NOx reducing is calculated based on a change of the ammonia density at the downstream of the NSR catalyst under a rich air/fuel ratio. The surplus reducing agent amount is correlated with the NOx occlusion ability of the NSR catalyst. Therefore, the deterioration degree of the NSR catalyst can be detected based on the change of the ammonia density.

However, ammonia is produced at upstream of the NSR catalyst 40 under a rich air/fuel ratio. In addition, the ammonia produced amount may change in accordance with a deterioration condition of the start catalyst 38. Further, the ammonia amounts produced by the start catalyst 38 and the NSR catalyst will change depending on the catalyst bed temperature or the space velocity. Moreover, the ammonia produced amount will change as the accelerator angle changes in a transient operation. Thus, if the deterioration is determined only based on the ammonia density at downstream of the NSR catalyst like in the apparatus disclosed in the patent document 1, the judgment accuracy may become insufficient.

In contrast, the system according to the present first embodiment performs the deterioration determination by considering not only the ammonia density at the downstream of the NSR catalyst 40 but further also the oxygen density at the downstream of the NSR catalyst 40. In detail, the deterioration determination is performed based on the reference that is whether ammonia exists under existence of oxygen at downstream of the NSR catalyst 40.

In a case where the NSR catalyst 40 is normal, a reaction represented by the following formula (1) occurs in the NSR catalyst 40. That is, an oxidize reaction of ammonia occurs at the boundary of a metal (platinum or rhodium) supported by the NSR catalyst 40. This reaction occurs because ammonia is a strong reducing agent like hydrogen. Accordingly, ammonia and oxygen must not be exhausted from the NSR catalyst 40 together, in a case where the NSR catalyst 40 is normal.

$$4NH_3 + 3O_2 \rightarrow 2N_2 + 6H_2O \tag{1}$$

On the other hand, the reaction represented by the above formula (1) (i.e., oxidize reaction of ammonia) would not occur even if ammonia coexists with oxygen in the NSR catalyst 40 in a case where the NSR catalyst 40 is deteriorated. Thus, ammonia and oxygen are exhausted from the NSR catalyst 40 together, when the NSR catalyst 40 is deteriorated.

The oxidize reaction of ammonia represented by the above formula (1) is a basic reaction in the NSR catalyst 40. The present first embodiment performs the deterioration determination depending on whether the basic reaction occurs or not. Further, in the present first embodiment, the change of ammonia amount produced by the start catalyst 38 gives no effect to the determination result. Accordingly, the deterioration of the NSR catalyst 40 is judged accurately.

Concrete Treatment in First Embodiment

Figure 2:
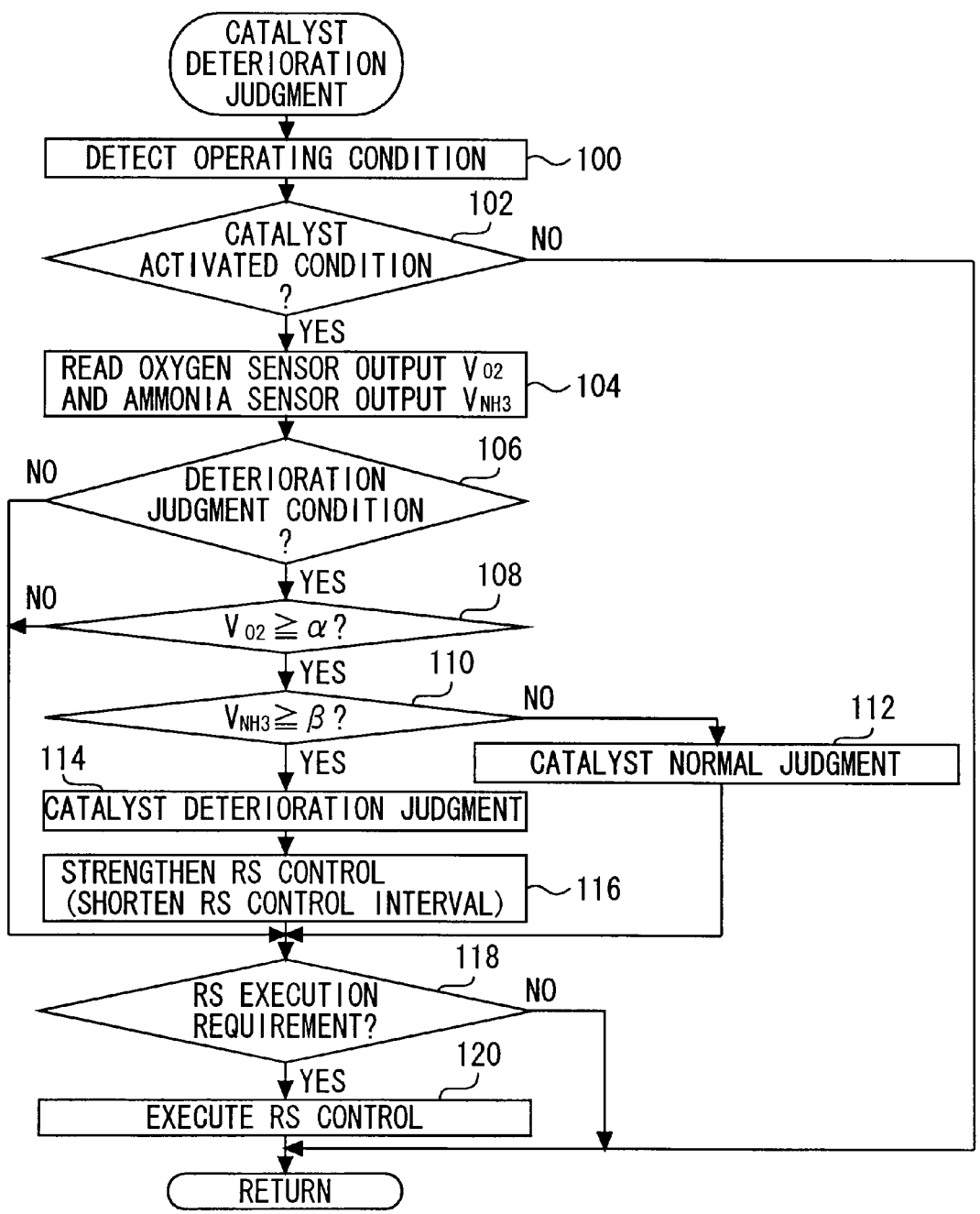
FIG. 2 is a flowchart of a routine executed by an ECU 60 in the first embodiment of the present invention.

FIG. 2 is a flowchart showing the routine performed by the ECU 60 in the present embodiment.

According to the routine shown in FIG. 2, an operating condition (NE, KL etc.) is detected at first (step 100). Next, it is determined whether the NSR catalyst 40 is in an activated state (step 102). In this step 102, it is judged to be in the activated state when, for example, the catalyst bed temperature is more than 300 degrees Celsius and the cooling water temperature Tw is more than 70 degrees Celsius. If it is determined that the NSR catalyst 40 is not in the activated state in this step 102, the present routine is once terminated.

On the other hand, if it is determined that the NSR catalyst 40 is in the activated state in this step 102, oxygen sensor output VO2 and ammonia sensor output VNH3 are read (step 104). According to the present step 104, the oxygen density and the ammonia density at the downstream of the NSR catalyst 40 are acquired.

Afterwards, it is judged whether the condition for deterioration determination is satisfied (step 106). In this step 106, the condition for deterioration determination is judged satisfied when, for example, the space velocity SV is equal to or smaller than 50000.

Here, the space velocity SV is a value that is calculated by dividing a gas amount flowing through the catalyst per unit time by the catalyst capacity, and can be estimate from the operating condition detected in the above step 100. Accordingly, since the catalyst capacity is predefined, the space velocity SV can be acquired if the gas amount flowing through the catalyst is estimated based on the operating condition.

Under an operating condition in which oxygen density and ammonia density change rapidly (for example, during high-speed traveling or sudden accelerating/immediate deceleration time), the condition for deterioration determination is judged not to be satisfied in the above step 106 because the space velocity SV exceeds 50000. In this case, the processing will move to step 118 described later without performing the deterioration judgment of the NSR catalyst 40.

In a case where the condition for deterioration determination is judged to be satisfied in the above step 106, it is judged whether the oxygen sensor output VO2 read in the above step 104 is equal to or more than the reference value a (step 108). This reference value a is a numeric value (e.g., 0.3%-0.5%) corresponding to the oxygen density prevailing downstream of the NSR catalyst 40 when the air/fuel ratio is stoichiometric. The oxygen sensor output VO2, therefore, becomes equal to or larger than the reference value a when the air/fuel ratio is stoichiometric or lean air/fuel ratio.

When the oxygen sensor output VO2 is judged to be smaller than the reference value a in the above step 108, it can be determined that there is no or very small amount, if existing, of oxygen at downstream of the NSR catalyst 40. In the present embodiment, the catalyst deterioration determination is performed based on an ammonia density under an existence of oxygen. Thus, in the present case, the processing moves to step 118 without performing the deterioration determination of the NSR catalyst 40.

When the oxygen sensor output VO2 is judged to be equal to or more than the reference value a in the above step 108, it can be determined that oxygen exists to some extent at downstream of the NSR catalyst 40. In this case, it is judged whether the ammonia sensor output VNH3 read in the above step 104 is equal to or more than a reference value β (step 110). This reference value β corresponds to, for example, a numeric value prevailed when the ammonia density is 10 ppm.

When the ammonia sensor output VNH3 is judged to be smaller than the reference value β in the above step 110, it can be determined that the ammonia reaction represented by the above formula (1) is occurring in the NSR catalyst 40. In this case, the NSR catalyst 40 is judged to be normal (not to be deteriorated) (step 112).

On the other hand, when the ammonia sensor output VNH3 is judged to be equal to or larger than the reference value β in the above step 110, it can be determined that there exists some ammonia at the downstream of the NSR catalyst 40 even though oxygen exists therein. In this case, it can be estimated that the reaction represented by the above formula (1) does not occur in the NSR catalyst 40. Thus, it can bee determined that the NSR catalyst 40 has been deteriorated (step 114). In summary, the NSR catalyst 40 is judged to be deteriorated when the oxygen sensor output VO2 is equal to or more than the reference value a and the ammonia sensor output VNH3 is equal to or more than the reference value β, as shown in FIG.

Figure 3:
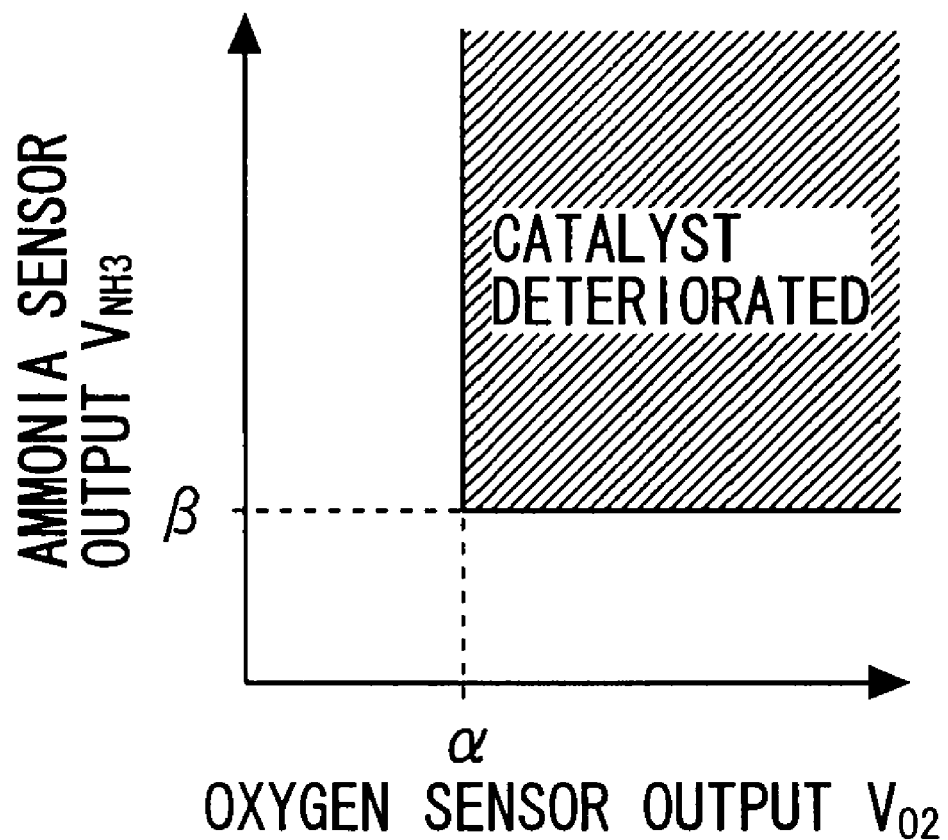
FIG. 3 is a drawing which shows an area defined by an oxygen sensor output VO2 and an ammonia sensor output VNH3 in which the catalyst is judged to be deteriorated in the first embodiment of the present invention.

3. FIG. 3 is a drawing that shows a region defined by an oxygen sensor output VO2 and an ammonia sensor output VNH3 in which catalyst deterioration is determined.

When the NSR catalyst 40 deteriorates, it becomes necessary to strengthen the rich spike (hereinafter referred to "RS") control, since the NOx occlusion ability deteriorates. Thus, step 116 is performed to shorten the RS control interval so as to increase the frequency of execution of the NOx reducing control and strengthen the RS control.

Next, it is determined whether there is an RS execution requirement (step 118). In this step 118, it is judged that RS execution is required if the interval (trip distance or trip time) after execution of the last RS reaches the RS interval. When the RS execution is judged not to be required in this step 118, this routine is once terminated. On the other hand, if it is determined that the RS execution is required, the RS control is performed (step 120). Afterwards, this routine is once terminated.

As discussed above, according to the routine shown in FIG. 2, the NSR catalyst 40 is judged to be deteriorated, when the oxygen sensor output VO2 is equal to or more than the reference value a and the ammonia sensor output VNH3 is equal to or more than the reference value β. That is, the deterioration determination of the NSR catalyst 40 is provided, a deterioration judgment of NSR catalyst 40 is performed based on whether the ammonia oxidize reaction that is the basic reaction of the NSR catalyst 40 occurs.

Although the present first embodiment describes a case in which the deterioration of the NSR catalyst 40 is judged, the present invention can be applied to a case in which the deterioration determination is performed as for the start catalyst 38. In this case, the ammonia oxidize reaction will occur when the start catalyst 38 is normal, and the ammonia oxidize reaction will not occur when the start catalyst 38 is deteriorated. Accordingly, it is possible to perform the deterioration determination of the start catalyst 38 by accurately detecting the oxygen density and the ammonia density at the downstream of the start catalyst 38 (this is identical in the following other embodiments).

Further, the ammonia density may be detected by a NOx sensor instead of the ammonia sensor 46, and the oxygen density may be detected by a air/fuel ratio sensor instead of the oxygen sensor 44 (this is identical in the following other embodiments).

It should be noted that, in the present first embodiment, the internal combustion engine 1 corresponds to the "internal combustion engine" in the first aspect of the present invention; the exhaust path 36 corresponds to the "exhaust system" in the first aspect of the present invention; the NSR40 corresponds to the "exhaust purification catalyst" in the first aspect of the present invention; the oxygen sensor 44 corresponds to the "oxygen density detecting means" in the first aspect of the present invention; and the ammonia sensor 46 corresponds to the "ammonia density detecting means" in the first aspect of the present invention, respectively. Further, in the present first embodiment, the ECU 60 implements the "deterioration judgment means" in the first aspect of the present invention by executing the processing through step 108 to 114; and the "deterioration judgment means" in the second, third and sixth aspects of the present invention by performing the treatments of step 108, 110 and 114, respectively.

Second Embodiment

A second embodiment of the present invention will now be described with reference to FIGS. 4 and 5.

[Description of System Configuration]

Figure 4:
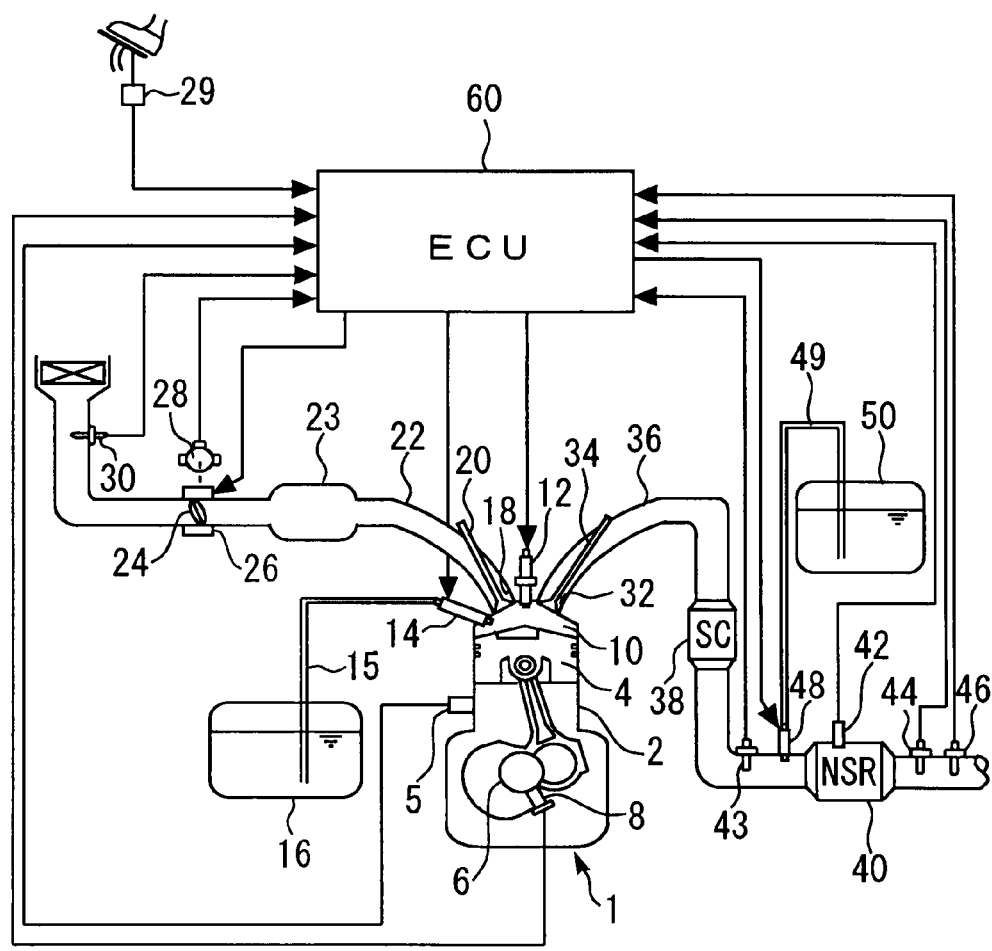
FIG. 4 is a drawing to explain the structure of a system according to a second embodiment of the present invention.

FIG. 4 is a drawing to explain the configuration of a system according to the second embodiment of the present invention. The system shown in FIG. 4 further includes a urea injector 48 to inject urea or urea water (hereinafter, abbreviated with "urea") that acts as reducing agent to the upper stream of the NSR catalyst 40 in addition to the system configuration shown in FIG. 1. The urea injector 48 is, through a fuel pass 49, connected to a urea water tank 50. Urea water is stored in the urea water tank 50. Further, the urea injector 48 is connected to the output side of the ECU60.

In the above described first embodiment, the deterioration judgment is performed based on the oxygen density and the ammonia density at the downstream of the NSR catalyst 40, that is, the ammonia density under existence of oxygen.

However, ammonia is produced neither at the start catalyst 38 nor at the NSR catalyst 40 in some cases, especially when the air/fuel ratio is a lean air/fuel ratio. Because of this, there is a possibility that ammonia amount existing in the NSR catalyst 40 becomes very small. Thus, there is a possibility that the ammonia density at down stream of the NSR catalyst becomes low even if the NSR catalyst 40 has been deteriorated.

In contrast, the present second embodiment performs the deterioration judgment of the NSR catalyst 40 during urea injection by the urea injector 48.

Here, the injection of urea or urea water that acts as a reducing agent from the urea injector 42 provided at upstream of the NSR catalyst 40 causes a reaction represented by the following formula (2) so as to produce ammonia.

$$(NH2)2CO + H2O \rightarrow 2NH3 + CO2 \quad (2)$$

The generated ammonia reduces NOx occluded in the NSR catalyst 40 as represented by the following formula (3).

$$NO + NO2 + NH3 \rightarrow 2N2 + 3H2O \quad (3)$$

Even though ammonia is used in the reduction reaction of the above formula (3), there is still enough amount of ammonia in the NSR catalyst 40. It is, therefore, possible to make enough amount of ammonia and oxygen coexist in the NSR catalyst 40. As a result, the ammonia density at downstream of the NSR catalyst 40 becomes high when the NSR catalyst 40 is deteriorated. Accordingly, the deterioration judgment of the NSR catalyst 40 can be executed more accurately compare to the case of above first embodiment.

Concrete Treatment in Second Embodiment

Figure 5:
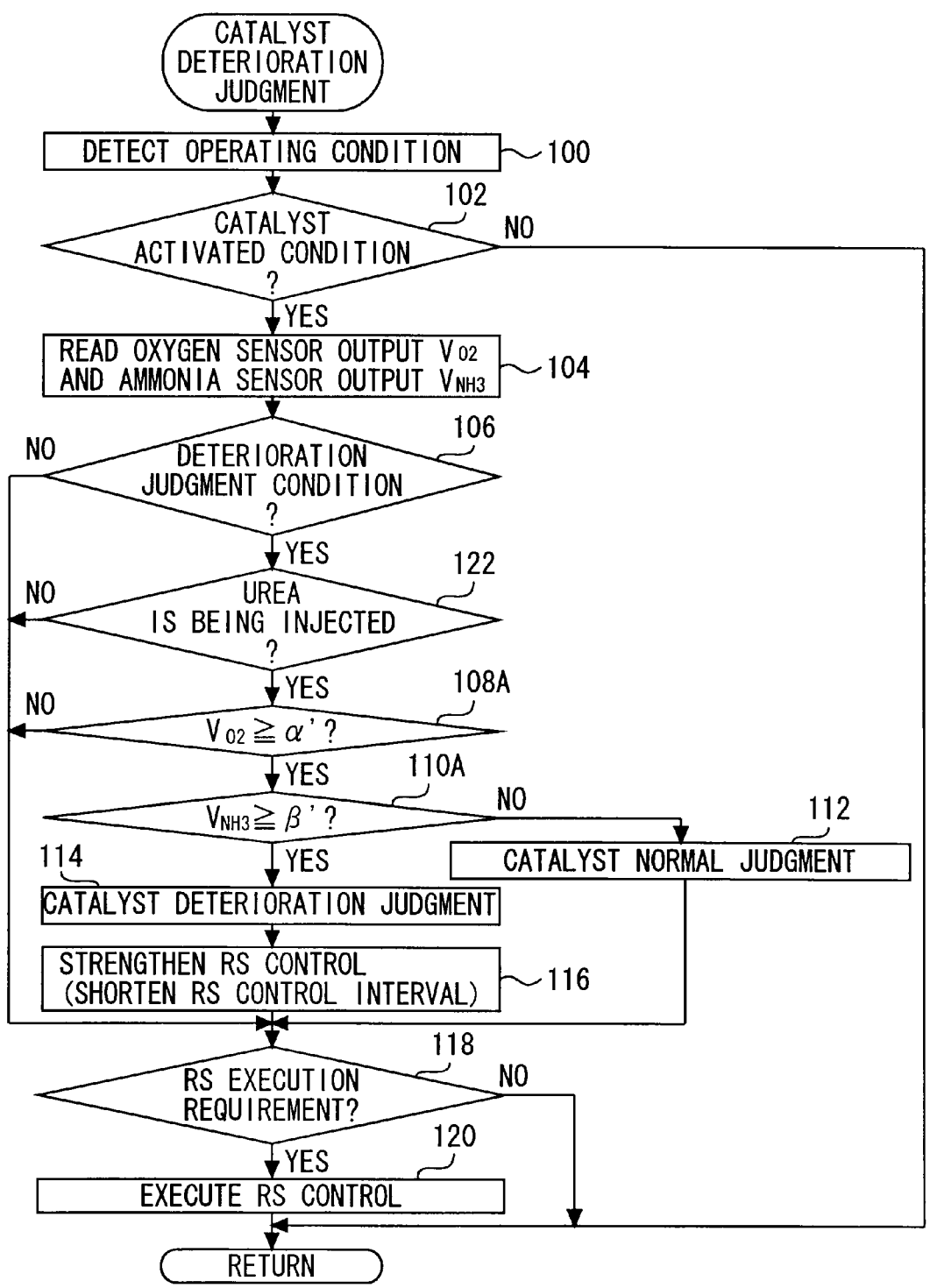
FIG. 5 is a flowchart of a routine executed by the ECU 60 in the second embodiment of the present invention.

FIG. 5 is a flowchart showing the routine executed by the ECU60 in the present second embodiment. In the routine shown in FIG. 5, processing of step 122 is added to the routine shown in FIG. 2 at between step 106 and 108.

It should be noted that although the reference values a', β' used in the judgment processing at steps 108, 110 are different from the reference values a, β, in step 108, 110 of the routine shown in FIG. 2, they may be the same.

According to the routine shown in FIG. 5, processing is proceeded until step 106 firstly, like the case of the routine shown in FIG. 2. In a case where it is determined in step 106 that the deterioration judgment condition is satisfied, it is judged whether urea is being injected from the urea injector 48 (step 122).

If it is judged in this step 122 that urea is not being injected, it is determined that making enough amount of ammonia exist in the NSR catalyst 40 is impossible, since ammonia is not generated in the NSR catalyst 40. In this case, the processing moves to step 118 without performing the deterioration judgment of the NSR catalyst 40.

On the other hand, if it is judged in the above step 122 that urea is being injected, it is determined that making enough amount of ammonia exist in the NSR catalyst 40 is possible, since ammonia is generated in accordance with the above formula (2) in the NSR catalyst 40. In this case, processing of and after step 108A is execute, likewise in the routine shown in FIG. 2.

In detail, if the oxygen sensor output VO2 is judged in step 108A to be equal to or larger than the reference value a' and the ammonia sensor output VNH3 is judged in step 110A to be equal to or smaller than the reference value β', the NSR catalyst 40 is determined to be normal (step 112). On the other hand, if the oxygen sensor output VO2 is judged in step 108A to be equal to or larger than the reference value a' and the ammonia sensor output VNH3 is judged in step 110A to be equal to or larger than the reference value β', the NSR catalyst 40 is determined to be deteriorated (step 114). Here, the reference value a' corresponds to, for example, a numeric value prevailed when oxygen density is 1%. Further, the reference value β' corresponds to, for example, a numeric value prevailed when ammonia density is 50 ppm.

As discussed above, the deterioration judgment of the NSR catalyst 40 is executed while urea is injected from the urea injector 48, according to the routine shown in FIG. 5. It is possible to make enough amount of ammonia exist in the NSR catalyst 40 during urea is being injected, since ammonia is generated in the NSR catalyst 40. It is, therefore, possible to perform the deterioration judgment of the NSR catalyst 40 under a situation in which sufficient oxygen and ammonia coexist in the NSR catalyst 40. Accordingly, it is possible to perform the deterioration judgment of the NSR catalyst 40 more accurately compare to the above first embodiment, since the accuracy of the estimation as for whether the ammonia oxidize reaction occurs in the NSR catalyst 40 is improved.

In the present second embodiment, it should be noted that the NSR catalyst 40 corresponds to the "NOx occlusion reduction catalyst" in the fourth aspect of the present invention, and the urea injector 48 corresponds to the "urea injection means" in the fourth aspect of the present invention, respectively. Further, the "deterioration judgment means" in the second, fourth or sixth aspect of the present invention is implemented by the ECU 60 when it performs the processing of steps 122, 108A, 110A, 112, and 114. handling of 112, 114 in the above second embodiment.

Third Embodiment

A third embodiment of the present invention will now be described with reference to FIG. 6.

The system according to the present third embodiment can be realized by making the ECU 60 perform a routine shown in FIG. 6 discussed later while using the hardware configuration shown in FIG. 1.

Feature of Third Embodiment

In the present third embodiment, the deterioration judgment of the NSR catalyst 40 is performed under a situation in which the RS control is executed. During the RS control is executed, air/fuel ratio is controlled to, for example, around 12. In this case, the ammonia generated in the start catalyst 38 flows into the NSR catalyst 40, in addition to the ammonia exhausted from the internal combustion engine 1. Further, ammonia is generated also in the NSR catalyst 40.

On the other hand, in the NSR catalyst 40, the occluded NOx is reduced by reducing agent such as ammonia or CO. Due to the reducing, oxygen and nitrogen or the like are generate. Because of this, it is possible to make oxygen and ammonia coexist in the NSR catalyst 40.

As a result, the ammonia density at downstream of the NSR catalyst 40 becomes high when the NSR catalyst 40 is deteriorated. Thus, the deterioration judgment of the NSR catalyst 40 can be performed more accurately compare to the above first embodiment.

Concrete Processing in Third Embodiment

Figure 6:
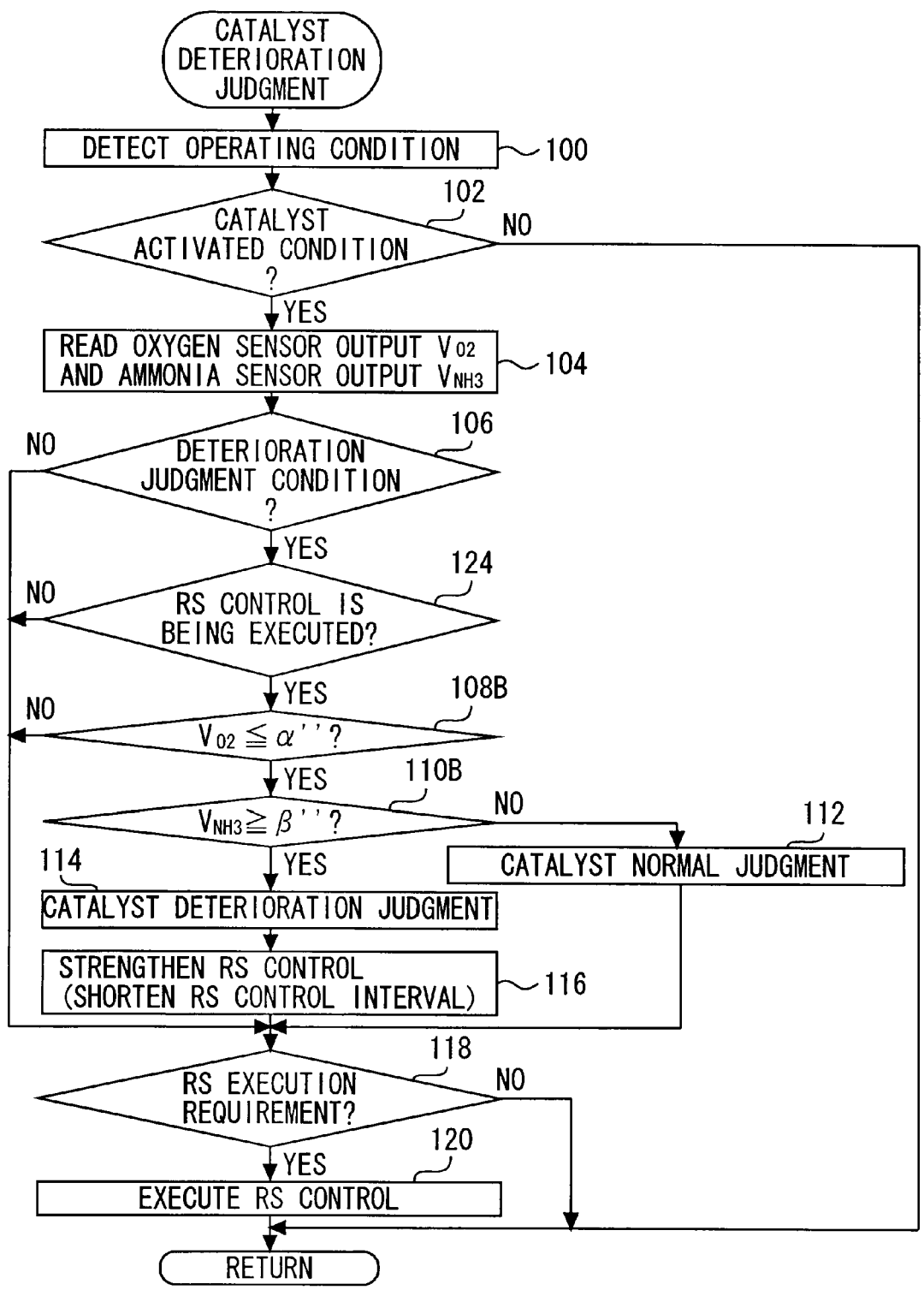
FIG. 6 is a flowchart of a routine executed by the ECU 60 in a third embodiment of the present invention.

FIG. 6 is a flowchart showing the routine executed by the ECU 60 in the present third embodiment.

According to the routine shown in FIG. 6, the processing is proceeded until step 106 at first, likewise the routine shown in FIG. 2. In a case where it is determined in step 106 that the deterioration judgment condition is satisfied, it is judged whether the RS control is being executed (step 124).

In a case where it is judged in the above step 124 that the RS control is not being executed, that is, in a case where the air/fuel ratio is controlled to the stoichiometric of a lean air/fuel ratio, it is determined that there is a possibility that making enough amount of ammonia exist in the NSR catalyst 40 is impossible. In this case, the processing moves to step 118 without performing the deterioration judgment of the NSR catalyst 40.

On the other hand, if it is judged in the above step that the RS control is being executed, it is determined that making enough amount of ammonia exist in the NSR catalyst 40 is possible, and making oxygen exist is possible by reducing NOx. In this case, processing of and after step 108B is execute, likewise in the routine shown in FIG. 2. Here, since the RS control is being executed, step 108B is performed so as to judge whether the oxygen sensor output VO2 is equal to or smaller than the reference value a".

In detail, if the oxygen sensor output VO2 is judged to be equal to or smaller than the reference value a" in step 108B and the ammonia sensor output VNH3 is judged to be equal to or smaller than the reference value β' in step 110A, the NSR catalyst 40 is determined to be normal (step 112). On the other hand, if the oxygen sensor output VO2 is judged to be equal to or smaller than the reference value a" in step 108A and the ammonia sensor output VNH3 is judged to be equal to or larger than the reference value β' in step 110A, the NSR catalyst 40 is determined to be deteriorated (step 114). Here, the reference value a" corresponds to, for example, a numeric value prevailed when oxygen density is 0.5%. Further, the reference value β" corresponds to, for example, a numeric value prevailed when ammonia density is 20 ppm.

As discussed above, the deterioration judgment of the NSR catalyst 40 is performed while the RS control is being executed based on both of the oxygen density and the ammonia density according to the routine shown in FIG. 5. During the execution of the RS control, oxygen is generated by the NOx reducing, in addition that ammonia is generated in the NSR catalyst 40. It is, therefore, possible to accurately perform the deterioration judgment of the NSR catalyst 40 based on the judgment whether an ammonia oxidize reaction occurs in the NSR catalyst 40, since it is possible to make ammonia and oxygen coexist in the NSR catalyst 40.

It should be noted that the "deterioration judgment means" in the fifth and sixth aspect of the present invention is realized by the ECU 60 when it performs the processing of step 124, 108B, 110B, 112 and 114.

Fourth Embodiment

A fourth embodiment of the present invention will now be described with reference to FIGS. 7 and 8.

[Description of System Configuration]

Figure 7:
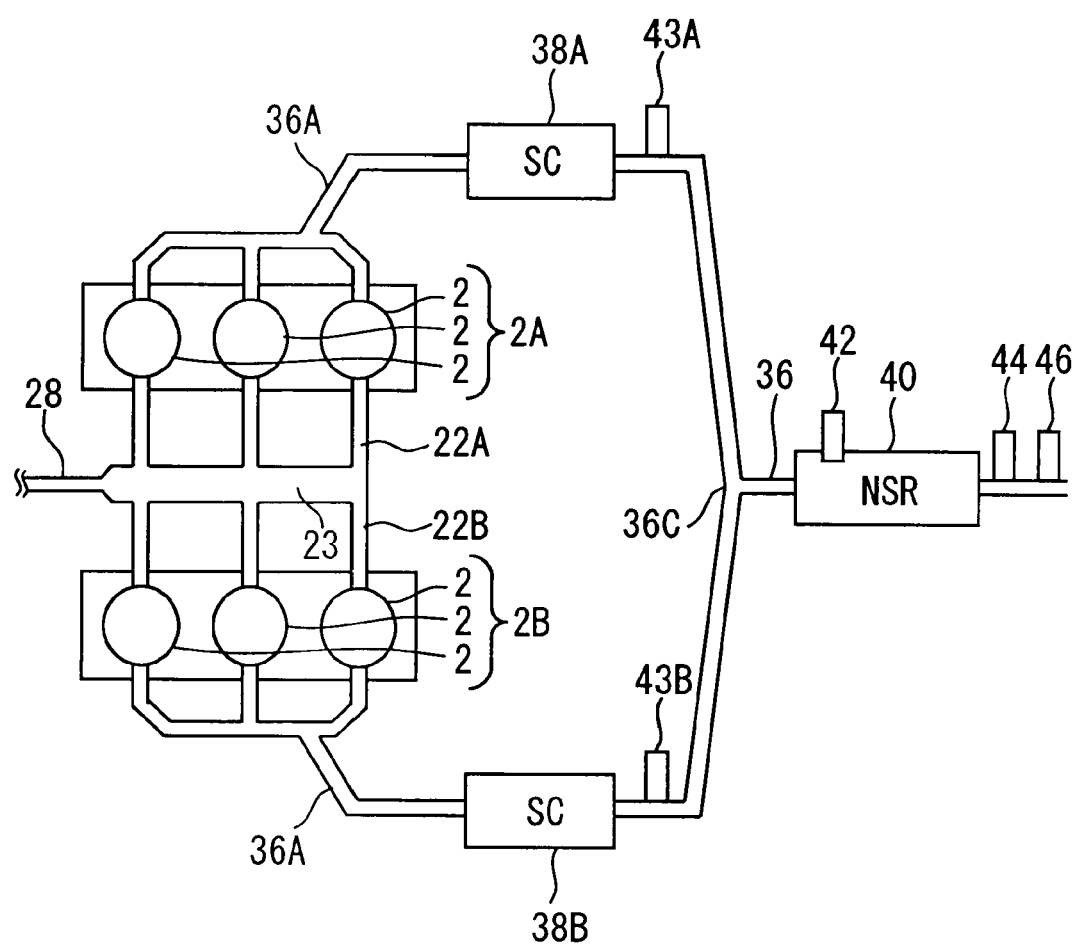
FIG. 7 is a drawing schematically showing a group of a plurality of cylinders in a system according to a fourth embodiment of the present invention.

FIG. 7 is a drawing schematically showing a group of a plurality of cylinders in a system according to a fourth embodiment of the present invention. As shown in FIG. 7, the cylinders 2 shown in FIG. 1 form a first cylinder group 2A and a second cylinder group 2B.

The first cylinder group is connected to a first exhaust path 36A in the middle which a first start catalyst 38A is installed. Likewise, the second cylinder group 2B is connected to the second exhaust path 36B in the middle of which a second start catalyst 38B is installed. Air fuel ratio sensors 43A, 43B are installed in each downstream of the start catalyst 38A, 38B, respectively.

The NSR catalyst 40 is provided in downstream of the junction 36C between the first exhaust path 36A and the second exhaust path 36B. Further, the oxygen sensor 44 and the ammonia sensor 46 are installed in the downstream of the NSR catalyst 40.

Feature of Fourth Embodiment

In the above-described system, rich burn operation and lean burn operation are executed in the cylinder groups 2A, 2B (or 2B, 2A), respectively during sulfur poisoning reactivating operation for the NSR catalyst 40. An exemplary case in which rich burn operation is carried out at the first cylinder group 2A and lean burn operation is performed at the second cylinder group 2B will be described hereafter. In such a case, rich exhaust gas exhaust from the first cylinder group 2A and lean exhaust gas exhausted from the second cylinder group 2B flow into the NSR catalyst 40. The catalyst bed temperature of the NSR catalyst 40 can be raised by burning (oxidizing) unburned HC or the like in the NOx catalyst 40.

The present fourth embodiment executes the deterioration judgment of the NSR catalyst 40 during the above described sulfur poisoning reactivating operation. For example, the air/fuel ratio of the first cylinder block 2A is control to 11-13 in a feedback manner. As a result, ammonia flows into the NSR catalyst 40 from the first cylinder group 2A through the first exhaust path 36A, as well as being produced in the NSR catalyst 40, likewise during the RS control operation in the above described third embodiment.

On the other hand, the air/fuel ratio of the second cylinder group 2B is controlled to 16-18 during the sulfur poisoning reactivating operation. Accordingly, oxygen flows into the NSR catalyst 40 from the second cylinder group 2B through the second exhaust path 36B.

Thus, oxygen and ammonia coexist in the NSR catalyst during the sulfur poisoning reactivating operation. Then, it is possible to perform the deterioration judgment of the NSR catalyst 40 based on the oxygen density and the ammonia density at the downstream of the NSR catalyst 40 as discussed above. In other words, it is possible to execute the deterioration judgment accurately by determining whether ammonia oxidizing reaction occurs in the NSR catalyst 40.

Concrete Treatment in Fourth Embodiment

Figure 8:
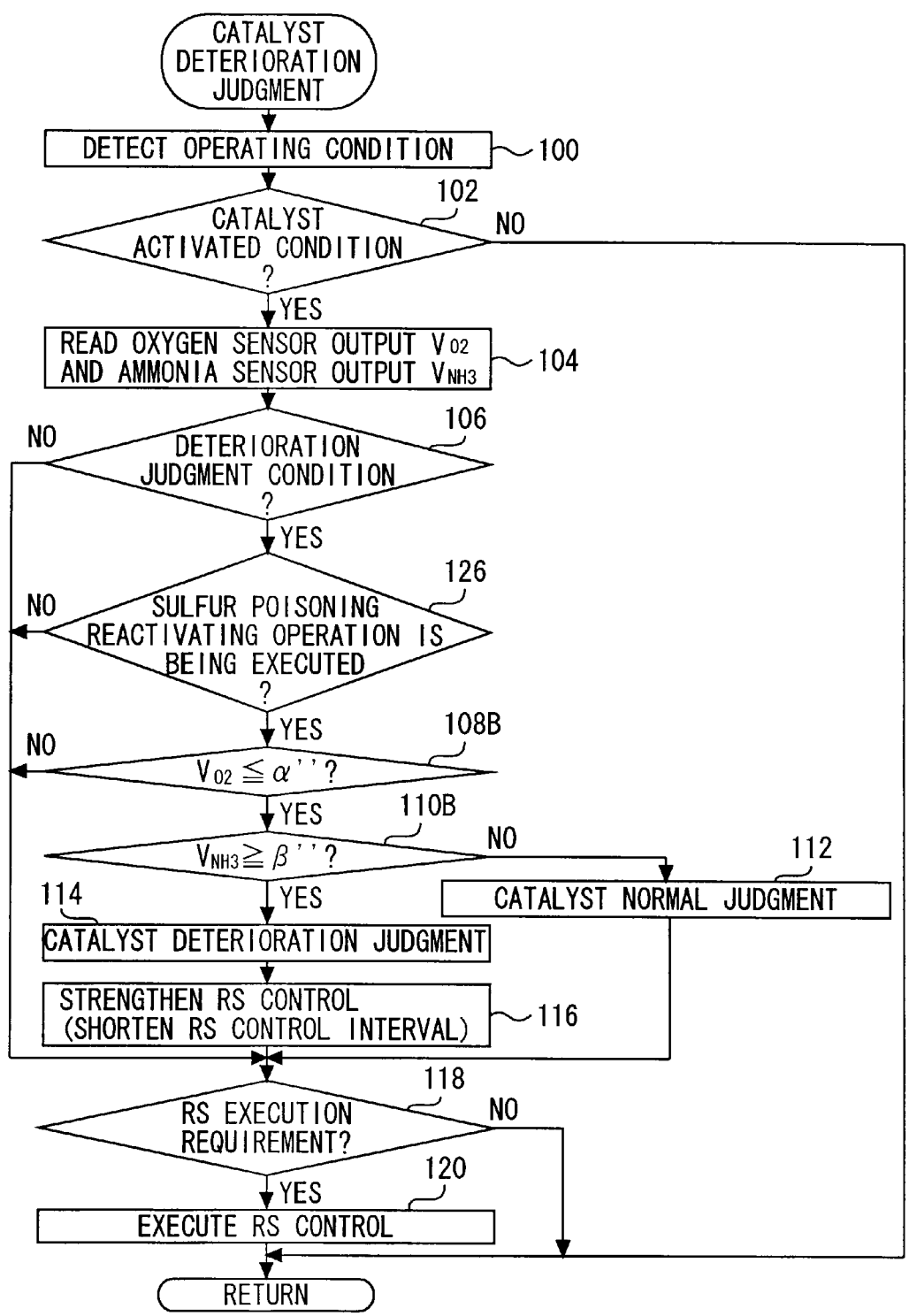
FIG. 8 is a flowchart of a routine executed by the ECU 60 in the fourth embodiment of the present invention.

FIG. 8 is a flowchart showing a routine executed by the ECU60 in the present fourth embodiment.

According to the routine shown in FIG. 8, processing is proceeded until step 106 firstly, like the case of the routine shown in FIG. 2. In a case where it is determined in step 106 that the deterioration judgment condition is satisfied, it is judged whether sulfur poisoning reactivating operation is being executed (step 126). In the present step 126, it is determined whether rich burn operation and lean burn operation are being executed in the cylinder groups 2A, 2B (or 2B, 2A), respectively.

In a case where it is judged in the above step 124 that the sulfur poisoning reactivating operation is not being executed, it is determined that making ammonia and oxygen coexist in the NSR catalyst 40 is impossible. In this case, the processing moves to step 118 without performing the deterioration judgment of the NSR catalyst 40.

On the other hand, if it is judged in the above step 124 that the sulfur poisoning reactivating operation is being executed, that is, if it is judged that rich burn operation and lean burn operation are executed in the cylinder groups 2A, 2B (or 2B, 2A), respectively, it is determined that making ammonia and oxygen coexist in the NSR catalyst 40 is possible. In this case, processing of and after step 108B is execute, likewise in the routine shown in FIG. 6. The oxygen flowing into NSR catalyst 40 is used to burn unburned fuel and oxidize ammonia. Because of this, it is judged whether the oxygen sensor output VO2 is equal to or smaller than the reference value a" in step 108B.

As in the case of the routine shown in FIG. 6, the NSR catalyst 40 is judged to be normal, if the oxygen sensor output VO2 is determined to be equal to or smaller than the reference value a" in step 108B and the ammonia sensor output VNH3 is judged to be smaller than the reference value β" in step 110B (step 112). On the other hand, the NSR catalyst 40 is judged to be deteriorated, if the oxygen sensor output VO2 is determined to be equal to or smaller than the reference value a" in step 108B and the ammonia sensor output VNH3 is judged to be equal to or larger than the reference value β" in step 110B (step 114).

As discussed above, the deterioration judgment of the NSR catalyst 40 is executed based on both of oxygen density and ammonia density during sulfur poisoning reactivating operation according to the routine shown in FIG. 8. Ammonia and oxygen can coexist in the NSR catalyst 40 during the sulfur poisoning reactivating operation, since rich burn operation and lean burn operation are performed in the cylinder groups 2A, 2B (or 2B, 2A), respectively. Thus, it is possible to accurately perform the deterioration judgment of the NSR catalyst 40 based on whether ammonia oxidize reaction occurs in the NSR catalyst 40.

It should be noted that the "deterioration judgment means" in the fifth or sixth aspect of the present invention is realized by the ECU60 when it performs the processing of step 126, 108B, 110B, 112 and 114.

Fifth Embodiment

A fifth embodiment of the present invention will now be described with reference to FIGS. 9 and 10.
[Description of System Configuration]

Figure 9:
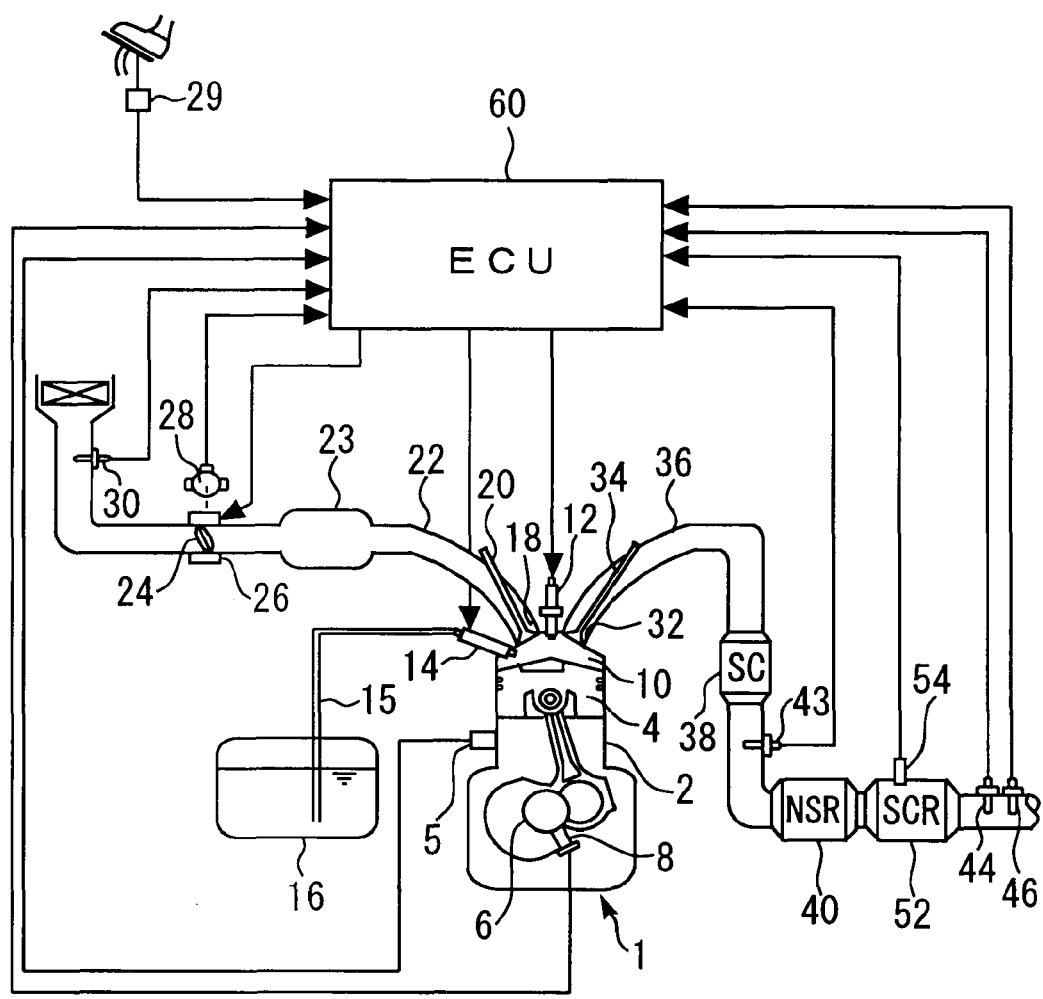
FIG. 9 is a drawing to explain the structure of a system according to a fifth embodiment of the present invention.

FIG. 9 is a drawing to explain structure of a system according to the present fifth embodiment. The system shown in FIG. 9 further includes a NOx selective reduction catalyst (referred to an "SCR catalyst" hereinafter) 52 provided between the NSR catalyst 40 and the oxygen sensor in addition to the system configuration shown in FIG. 1. The SCR catalyst 52 is provided to catch ammonia drained from the NSR catalyst 40. The SCR catalyst 52 is provided with a catalyst bed temperature sensor 54 detecting the catalyst bed temperature of the SCR catalyst 52. As shown in FIG. 9, the above described oxygen sensor 44 and ammonia sensor 46 are provided at downstream of the SCR catalyst 52.

Feature of Fifth Embodiment

The above described first to fourth embodiments execute the deterioration judgment of the NSR catalyst 40 based on both of the oxygen density and the ammonia density at the downstream of the NSR catalyst 40.

The system described above includes the SCR catalyst at the downstream of the NSR catalyst.

As stated above, ammonia flows into the NSR catalyst as well as being produced in the NSR catalyst 40 when a rich air/fuel ratio is prevailed. Accordingly, ammonia is drained from the NSR catalyst 40, and the drained ammonia flows into SCR catalyst 52 when a rich air/fuel ratio is prevailed.

If the SCR catalyst 52 is normal, ammonia is not exhausted from the SCR catalyst 52 since the ammonia is occluded by the SCR catalyst 52. In this case, the ammonia density at the downstream of the SCR catalyst 52 becomes approximately zero. On the other hand, when the SCR catalyst 52 is deteriorated, a large quantity of ammonia is exhausted from the SCR catalyst 52 because the ammonia is not occluded by the SCR catalyst 52. Therefore, the ammonia density at the downstream of the SCR catalyst 52 becomes high.

Further, the oxygen density at the downstream of the SCR catalyst 52 becomes lower than the reference value usually when the air/fuel ratio is rich, since no oxygen is supplied to the SCR catalyst 52. The ammonia oxidizing reaction occurs when the oxygen density at downstream of the SCR catalyst 52 is higher than the reference value, since there exist sufficient amount of oxygen in the NSR catalyst 40. Because of this, it may become impossible to detect the ammonia occlusion ability of the SCR catalyst 52 based on the ammonia density at downstream of the SCR catalyst 52 when the oxygen density is higher than the reference value.

Thus, the deterioration judgment of the SCR catalyst 52 can be executed based on both of the oxygen density and the ammonia density at downstream of the SCR catalyst 52 when the air/fuel ratio is rich.

Concrete Treatment in Fifth Embodiment

Figure 10:
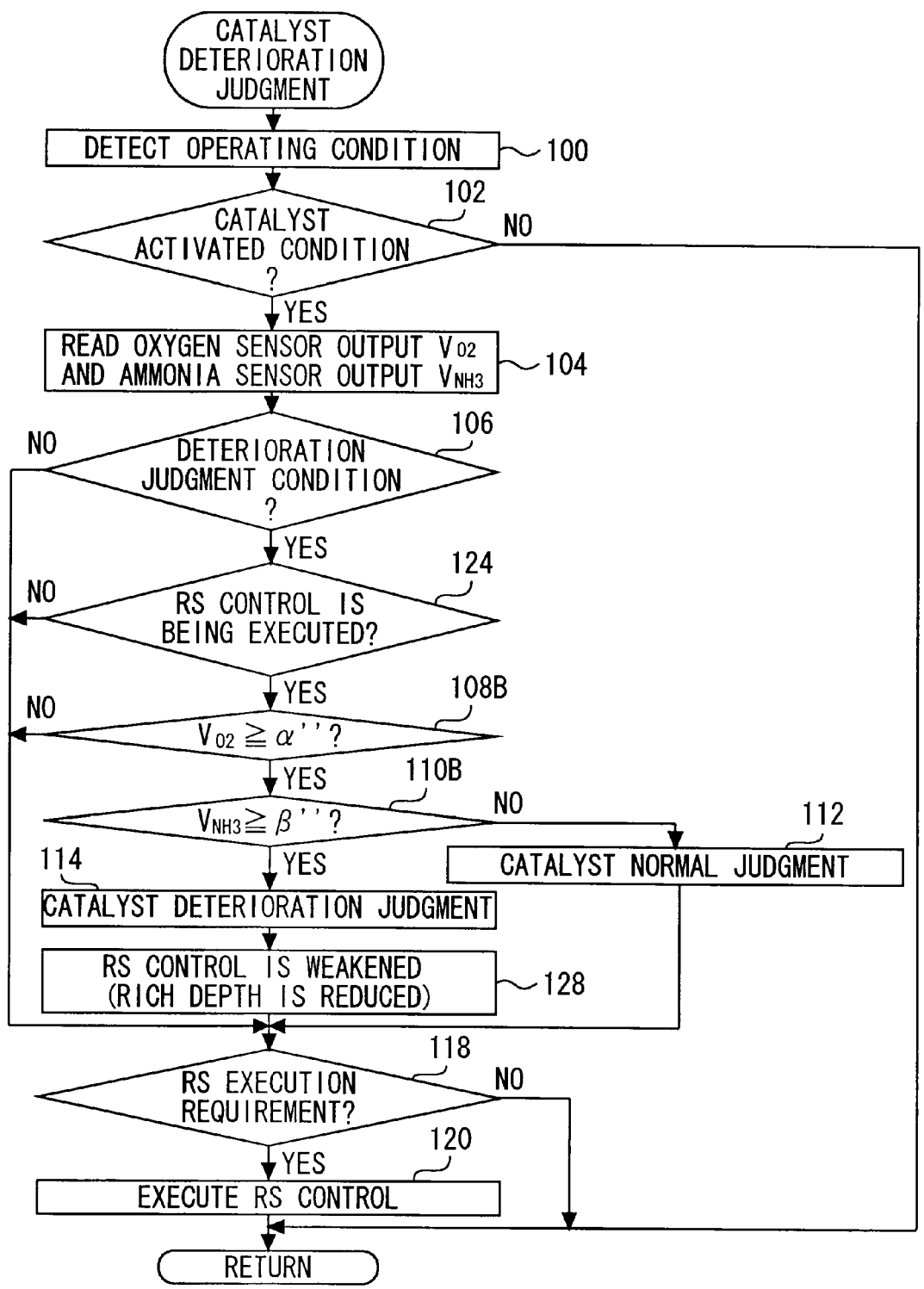
FIG. 10 is a flowchart of a routine executed by the in the fifth embodiment of the present invention.

FIG. 10 is a flowchart showing the routine executed by the ECU 60 in the present fifth embodiment.

According to the routine shown in FIG. 10, processing is proceeded until step 106 firstly, like the case of the routine shown in FIG. 2. Here, the judgment in step 102 is performed based on both of the bed temperatures in the NSR catalyst 40 and the SCR catalyst 52.

In a case where it is determined in step 106 that the deterioration judgment condition is satisfied, it is judged whether the RS control is being executed (step 124). In a case where it is judged in the above step 124 that the RS control is not being executed, it is determined that the amount of ammonia exhausted from the NSR catalyst 40 is not sufficient. In this case, the processing moves to step 118 without performing the deterioration judgment of the SCR catalyst 52.

On the other hand, if it is judged in the above step that the RS control is being executed, it is determined that sufficient amount of ammonia is exhausted from the NSR catalyst 40. In this case, it is judged whether the oxygen sensor output VO2 is equal to or smaller than the reference value a", since the RS control is being executed (step 108B). When the oxygen sensor output VO2 is determined to be larger than the reference value a" in the present step 108B, it is judged that ammonia oxidizing reaction may occur in the NSR catalyst 40. In this case, the processing will move to step 118 without performing the deterioration judgment of the SCR catalyst 52, since it is impossible to perform accurately the catalyst deterioration judgment based on the ammonia density at downstream of the SCR catalyst 52.

In a case where the oxygen sensor output VO2 is judged to be equal to or less than the reference value a" in the above step 108B, it is determined whether the ammonia sensor output VNH3 is equal to or more than the reference value β" (step 110B). If the ammonia sensor output VNH3 is judged to be smaller than the reference value β" in the present step 110A, it is judged that the ammonia occlusion ability of the SCR catalyst 52 is high enough and that the SCR catalyst 52 is normal (step 112).

On the other hand, if the ammonia sensor output VNH3 is judged to be equal to or higher than the reference value β" in this step 110A, it is judged that the ammonia occlusion ability of the SCR catalyst 52 is degraded and that the SCR catalyst 52 is deteriorated (step 114). Afterwards, the RS control is weakened in order to suppress the exhaustion of ammonia (step 128). In this step 128, for example, the rich depth (the rich degree) at the time of the RS control is reduced. Then, processing of and after step 118 is carried out, as in the case of the routine shown in FIG. 2.

As discussed above, according to the routine shown in FIG. 10, a deterioration judgment of the SCR catalyst 52 is executed based on both of the oxygen density and the ammonia density when the RS control is being performed. When the Rs control is being performed, ammonia is exhausted from the NSR catalyst 40, then the exhausted ammonia flows into the SCR catalyst 52. The SCR can occlude the ammonia flowing therein when it is normal. It is, therefore, possible to estimate the ammonia occlusion ability of the SCR catalyst 52 and to perform the deterioration judgment of the SCR catalyst 52 based on the ammonia density at downstream of the SCR catalyst 52 when the RS control is being performed.

Although the system in which the NSR catalyst 40 and the SCR catalyst 52 that are independent from each other are serially placed is described in the present fifth embodiment, the NSR catalyst and the SCR catalyst may be formed integrally as well as may be configured by two layered coatings (the same is applicable to a sixth embodiment described later).

It should be noted that, in the present fifth embodiment, the NSR catalyst 40 corresponds to the "NOx occlusion reduction catalyst" in the seventh aspect of the present invention; and the SCR catalyst 52 corresponds to the "NOx selection reducing catalyst" in the seventh aspect of the present invention, respectively. Further, in the present fifth embodiment, the "deterioration judgment means" in the seventh or eighth aspect of the present invention is implemented by the ECU 60 when it performs the processing of step 124, 108B, 110B, 112 and 114.

Sixth Embodiment

A sixth embodiment of the present invention will now be described with reference to FIGS. 11 and 12.
[Description of System Configuration]

Figure 11:
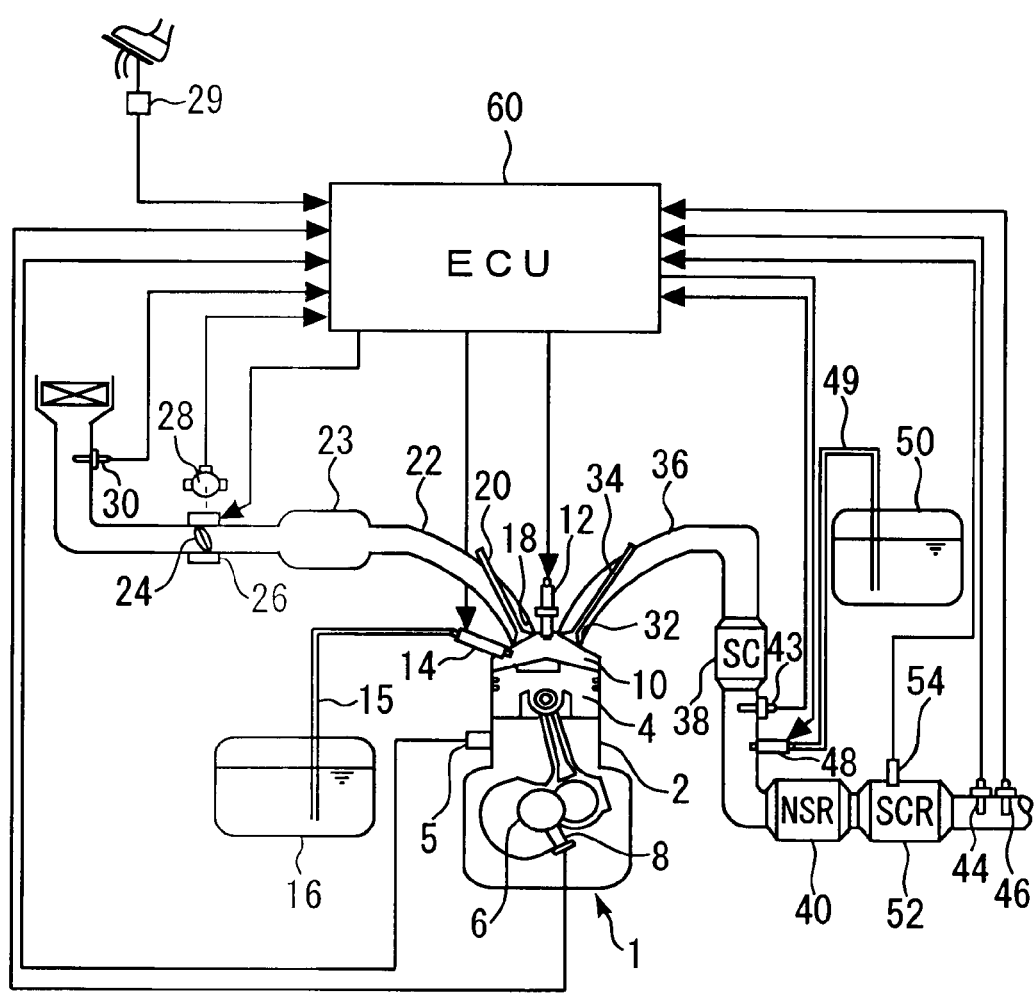
FIG. 11 is a drawing to explain the structure of a system according to a sixth embodiment of the present invention.

FIG. 11 is a drawing to explain the structure of a system according to the present sixth embodiment. The system shown in FIG. 11 further includes an urea injector 48 that injects urea or urea water (abbreviated with "urea" hereafter) which acts as a reducing agent into upstream of the NSR catalyst 40, in addition to the system configuration shown in FIG. 9. The urea injector 48 is connected to an urea water tank 50 through the fuel passage 49. The urea water tank 50 accommodates urea water. Further, the urea injector is connected to the output side of the ECU 60.

Feature of Sixth Embodiment

In the above described fifth embodiment, ammonia is exhausted from the NSR catalyst 40 and the exhausted ammonia flows into the SCR catalyst 52 when the RS control is being executed. Then, the ammonia occlusion ability of the SCR catalyst 52 is estimated based on the ammonia density at the downstream of the SCR catalyst 52 so as to perform the deterioration judgment of the SCR catalyst 52 based on the estimated ammonia occlusion ability. Thus, the opportunity for performing the deterioration judgment can arrive only within a period during which the RS control is executed.

In contrast, the present sixth embodiment produces ammonia in exhaust gas and in the NSR catalyst 40 by injecting urea from the urea injector 48 so that the ammonia is exhausted from the NSR catalyst 40. In such a case, the deterioration judgment can be executed based on the ammonia density at the downstream of the SCR catalyst 52 as in the case of the above described fifth embodiment, since ammonia flows into the SCR catalyst 52. It is, therefore, possible to perform the deterioration judgment of the SCR catalyst even under a situation in which the RS control is not being executed and the air/fuel ratio is stoichiometric or lean air/fuel ratio.

It should be noted that oxygen is supplied to the NSR catalyst 40 when the air/fuel ratio is stoichiometric or lean air/fuel ratio. In such a case, reactions of NOx reducing or ammonia oxidizing occur in the NSR catalyst 40 as described above, whereby the amount of ammonia exhausted from the NSR catalyst 40 may become insufficient. Thus, urea is injected excessively from the urea injector 48 so that ammonia is exhausted from the NSR catalyst 40.

Concrete Treatment in Sixth Embodiment

FIG. 12 is a flowchart showing the routine executed by the ECU 60 in the present sixth embodiment.

According to the routine shown in FIG. 12, processing is proceeded until step 106 firstly, as in the case of the routine shown in FIG. 10. In a case where it is determined in step 106 that the deterioration judgment condition is satisfied, it is judged whether urea is being injected (step 122). In this step 122, judgment is made to determine whether an excessive amount of urea compared to that injected during the normal NOx reducing operation for making ammonia be exhausted from the NSR catalyst 40 is injected.

If judgment is made in the above step 122 that urea is not being injected, it is determined that ammonia can not flow into the SCR catalyst 52. In this case, the processing will move to step 118 without performing the deterioration judgment of the SCR catalyst 52.

On the other hand, if it is judged in the above step 122 that urea is being injected, it is determined that ammonia exhausted from the NSR catalyst 40 can flow into the SCR catalyst 52. In this case, judgment is made to determine whether the oxygen sensor output VO2 is equal to or more than the reference value a (step 108). Usually, the output VO2 of the oxygen sensor that is placed downstream of the SCR catalyst 52 goes above the reference value a when the air/fuel ratio is stoichiometric or lean air/fuel ratio. If it is determined in this step 108 that the oxygen sensor output VO2 is smaller than the reference value a for some reasons, the processing moves to step 118 without performing the deterioration judgment of the SCR catalyst 52.

When the oxygen sensor output VO2 is judged to be equal to or more than the reference value a, the processing of and after step 110B is executed as in the case of the routine shown in FIG. 10.

In detail, if it is determined in this step 110A that the ammonia sensor output VNH3 is smaller than the reference value βB", the ammonia occlusion ability of the SCR catalyst 52 is judged to be sufficiently high, and the SCR catalyst 52 is judged to be normal (step 112). On the other hand, if the ammonia sensor output VNH3 is determined to be equal to or more than the reference value β" in this step 110A, the ammonia occlusion ability of the SCR catalyst 52 is judged to be degraded and the SCR catalyst is determined to be deteriorated (step 114).

As discussed above, according to the routine shown in FIG. 12, the deterioration judgment of the SCR catalyst is executed based on both of the oxygen density and the ammonia density during the urea injection. Ammonia exhausted from the NSR catalyst 40 can be flown into the SCR catalyst 52 by injecting excessive amount of urea compared to that injected during the normal NOx reducing operation. The SCR catalyst 52 can occlude the ammonia flowing therein when it is normal. It is, therefore, possible to estimate the ammonia occlusion ability of the SCR catalyst 52 and perform the deterioration judgment of the SCR catalyst 52 based on the ammonia density at downstream of the SCR catalyst 52.

It should be noted that, in the present sixth embodiment, the NSR catalyst 40 corresponds to the "NOx occlusion reduction catalyst" in the ninth aspect of the present invention; and the SCR catalyst 52 corresponds to the "NOx selection reducing catalyst" in the ninth aspect of the present invention, respectively. Further, in the present sixth embodiment, the "deterioration judgment means" in the ninth or tenth aspect of the present invention is implemented by the ECU 60 when it performs the processing of step 122, 108, 110B, 112 and 114.

The invention claimed is:

1. A catalyst deterioration judgment device, comprising:
    an exhaust purification catalyst that is installed in an exhaust system of an internal combustion engine so as to purify the exhaust gas;
    an oxygen density detecting means to detect the oxygen density at downstream of said exhaust purification catalyst;
    an ammonia density detecting means to detect the ammonia density at downstream of said exhaust purification catalyst; and
    deterioration judgment means performing a deterioration judgment of said exhaust purification catalyst based on both of said oxygen density and said ammonia density.

2. The catalyst deterioration judgment device according to claim 1, wherein said deterioration judgment means determines that said exhaust purification catalyst is deteriorated when said oxygen density is equal to or more than a predetermined value and said ammonia density is equal to or more than a specified value.

3. The catalyst deterioration judgment device according to claim 1, wherein said deterioration judgment means determines that said exhaust purification catalyst is deteriorated when air/fuel ratio is stoichiometric or lean and said ammonia density is equal to or more than a predetermined value.

4. The catalyst deterioration judgment device according to claim 2, wherein said exhaust purification catalyst comprises a NOx occlusion reduction catalyst that occludes or reduces NOx responding to air/fuel ratio,
    said catalyst deterioration judgment device further comprising urea injection means that injects urea into upstream of said NOx occlusion reduction catalyst, and
    wherein said deterioration judgment means performs said deterioration judgment when urea is being injected by said urea injection means.

5. The catalyst deterioration judgment device according to claim 1, wherein said deterioration judgment means determines that said exhaust purification catalyst is deteriorated when air/fuel ratio is rich and said ammonia density is equal to or more than a predetermined value under existence of oxygen.

6. The catalyst deterioration judgment device according to claim 2, wherein said deterioration judgment means determines that said exhaust purification catalyst is deteriorated when an ammonia oxidizing reaction does not occur in said exhaust purification catalyst under existence of oxygen.

7. The catalyst deterioration judgment device according to claim 1, wherein
said exhaust purification catalyst comprises a NOx occlusion reduction catalyst that occludes or reduces NOx responding to air/fuel ratio, and a NOx selective reduction catalyst installed in downstream of said NOx occlusion reduction catalyst; and
said deterioration judgment means performs the deterioration judgment of said NOx selective reduction catalyst when air/fuel ratio is rich.

8. The catalyst deterioration judgment device according to claim 7, wherein said deterioration judgment means determines that said NOx selective reduction catalyst is deteriorated when said oxygen density is equal to or less than a predetermined value and said ammonia density is equal to or more than a predetermined value.

9. The catalyst deterioration judgment device according to claim 1, wherein
said exhaust purification catalyst comprises a NOx occlusion reduction catalyst that occludes or reduces NOx responding to air/fuel ratio, and a NOx selective reduction catalyst installed in downstream of said NOx occlusion reduction catalyst,
said catalyst deterioration judgment device further comprising urea injection means that injects urea into upstream of said NOx occlusion reduction catalyst, and
wherein said deterioration judgment means performs said deterioration judgment of said NOx selective reduction catalyst when urea is being injected by said urea injection means so that ammonia is exhausted from said NOx occlusion reduction catalyst.

10. The catalyst deterioration judgment device according to claim 9, wherein said deterioration judgment means determines that said NOx selective reduction catalyst is deteriorated when said oxygen density is equal to or more than a predetermined value and said ammonia density is equal to or more than a predetermined value.

11. A catalyst deterioration judgment device, comprising:
an exhaust purification catalyst that is installed in an exhaust system of an internal combustion engine so as to purify the exhaust gas;
an oxygen density detecting unit to detect the oxygen density at downstream of said exhaust purification catalyst;
an ammonia density detecting unit to detect the ammonia density at downstream of said exhaust purification catalyst; and
deterioration judgment unit performing a deterioration judgment of said exhaust purification catalyst based on both of said oxygen density and said ammonia density.

12. The catalyst deterioration judgment device according to claim 11, wherein said deterioration judgment unit determines that said exhaust purification catalyst is deteriorated when said oxygen density is equal to or more than a predetermined value and said ammonia density is equal to or more than a specified value.

13. The catalyst deterioration judgment device according to claim 11, wherein said deterioration judgment unit determines that said exhaust purification catalyst is deteriorated when air/fuel ratio is stoichiometric or lean and said ammonia density is equal to or more than a predetermined value.

14. The catalyst deterioration judgment device according to claim 12, wherein said exhaust purification catalyst comprises a NOx occlusion reduction catalyst that occludes or reduces NOx responding to air/fuel ratio,
said catalyst deterioration judgment device further comprising a urea injection unit that injects urea into upstream of said NOx occlusion reduction catalyst, and
wherein said deterioration judgment unit performs said deterioration judgment when urea is being injected by said urea injection unit.

15. The catalyst deterioration judgment device according to claim 11, wherein said deterioration judgment unit determines that said exhaust purification catalyst is deteriorated when air/fuel ratio is rich and said ammonia density is equal to or more than a predetermined value under existence of oxygen.

16. The catalyst deterioration judgment device according to claim 12, wherein said deterioration judgment unit determines that said exhaust purification catalyst is deteriorated when an ammonia oxidizing reaction does not occur in said exhaust purification catalyst under existence of oxygen.

17. The catalyst deterioration judgment device according to claim 11, wherein
said exhaust purification catalyst comprises a NOx occlusion reduction catalyst that occludes or reduces NOx responding to air/fuel ratio, and a NOx selective reduction catalyst installed in downstream of said NOx occlusion reduction catalyst; and
said deterioration judgment unit performs the deterioration judgment of said NOx selective reduction catalyst when air/fuel ratio is rich.

18. The catalyst deterioration judgment device according to claim 17, wherein said deterioration judgment unit determines that said NOx selective reduction catalyst is deteriorated when said oxygen density is equal to or less than a predetermined value and said ammonia density is equal to or more than a predetermined value.

19. The catalyst deterioration judgment device according to claim 11, wherein
said exhaust purification catalyst comprises a NOx occlusion reduction catalyst that occludes or reduces NOx responding to air/fuel ratio, and a NOx selective reduction catalyst installed in downstream of said NOx occlusion reduction catalyst,
said catalyst deterioration judgment device further comprising a urea injection unit that injects urea into upstream of said NOx occlusion reduction catalyst, and
wherein said deterioration judgment unit performs said deterioration judgment of said NOx selective reduction catalyst when urea is being injected by said urea injection unit so that ammonia is exhausted from said NOx occlusion reduction catalyst.

20. The catalyst deterioration judgment device according to claim 19, wherein said deterioration judgment unit determines that said NOx selective reduction catalyst is deteriorated when said oxygen density is equal to or more than a predetermined value and said ammonia density is equal to or more than a predetermined value.

* * * * *